(12) United States Patent
Chen et al.

(10) Patent No.: US 11,407,012 B2
(45) Date of Patent: Aug. 9, 2022

(54) SONIC CLEANING OF OPTICAL FIBER DRAW FURNACE

(71) Applicant: CORNING INCORPORATED, Corning, NY (US)

(72) Inventors: Xiaoming Chen, Shanghai (CN); Yun Gang Li, Shanghai (CN); Zhi Ming Liu, Shanghai (CN)

(73) Assignee: Corning Incorporated, Corning, NY (US)

( * ) Notice: Subject to any disclaimer, the term of this patent is extended or adjusted under 35 U.S.C. 154(b) by 53 days.

(21) Appl. No.: 16/937,052

(22) Filed: Jul. 23, 2020

(65) Prior Publication Data

US 2021/0069758 A1  Mar. 11, 2021

(30) Foreign Application Priority Data

Aug. 5, 2019  (CN) .......................... 201910717420.4

(51) Int. Cl.
*B08B 7/02*  (2006.01)
*C03B 37/03*  (2006.01)

(52) U.S. Cl.
CPC ............ *B08B 7/028* (2013.01); *C03B 37/032* (2013.01)

(58) Field of Classification Search
None
See application file for complete search history.

(56) References Cited

U.S. PATENT DOCUMENTS

2005/0042559 A1  2/2005  Bird et al.

FOREIGN PATENT DOCUMENTS

| CN | 204779338 U | 11/2015 |
|---|---|---|
| CN | 106424071 A | 2/2017 |
| JP | 2010-202479 A | 9/2010 |
| WO | 98/53926 A1 | 12/1998 |
| WO | 01/78912 A1 | 10/2001 |
| WO | 2015/154998 A1 | 10/2015 |

OTHER PUBLICATIONS

EPO translation of CN204779338U retrieved from https://worldwide.espacenet.com/patent/search/family/054519429/publication/CN204779338U?q=cn204779338 on Nov. 10, 2021 (Year: 2021).*
International Search Report and Written Opinion of the International Searching Authority; PCT/CN2020/096503; dated Sep. 22, 2020; 7 Pages; China National Intellectual Property Administration, list of references, otherwise blank.

* cited by examiner

*Primary Examiner* — Eric W Golightly
(74) *Attorney, Agent, or Firm* — Kevin L. Bray

(57) ABSTRACT

A process for cleaning particulate matter from the interior of a muffle of an optical fiber draw furnace includes propagating sound waves through the interior of the muffle at a frequency of from about 75 Hz to about 5000 Hz and an intensity of from about 110 dB to about 160 dB.

14 Claims, 3 Drawing Sheets

SONIC CLEANING OF OPTICAL FIBER DRAW FURNACE

This Application claims priority from Patent Application in P. R. of China Serial Number 201910717420.4, filed on Aug. 5, 2019, and which is incorporated by reference herein in its entirety.

FIELD OF THE DISCLOSURE

Disclosed is a process and arrangement for cleaning interior surfaces of a draw furnace used in the production of optical fiber, and more particularly to processes and arrangements for dislodging microscopic and/or nanoscopic particles from internal surfaces of draw furnaces to prevent contamination of glass optical fibers during production. Most particularly, the disclosure pertains to removal of silicon carbide particles that accumulate on graphite surfaces of a draw furnace during optical fiber production. Removal of particles leads to a reduction in the number of particles released from the walls of the draw furnace during draw and minimizes particulate contamination of glass optical fibers. Avoiding contamination reduces occurrences of defects in glass optical fibers and minimizes lengthy and expensive production interruptions caused by breaks in glass optical fiber during draw.

BACKGROUND OF THE DISCLOSURE

Glass optical fibers used for transmission of optical signals are typically made in a two-step process. First, a glass preform is prepared. This usually involves depositing silica and dopants such as germanium and fluorine onto a rotating rod using an Outside Vapor Deposition (OVD) process to produce a porous glass body that is subsequently sintered and consolidated into a solid preform, or depositing silica and dopants on the inner surface of a rotating hollow silica tube using a Modified Chemical Vapor Deposition (MCVD) process to produce layers of glass soot inside the tube that are heated, softened and collapsed into a solid preform. Another common technique, known as Vapor-Phase Axial Deposition (VAD), is similar to the OVD process, except the preform can be continuously fabricated in an axial direction, with the deposition and consolidation steps arranged sequentially in the axial direction.

Regardless of how the preform is prepared, the second fundamental step in manufacturing glass optical fibers is to heat the preform in a draw furnace and continuously draw glass optical fiber from the heated preform. As the glass optical fiber is drawn, it cools and its diameter is sized (reduced) to meet a product specification (typically 125 microns). The cooled and sized glass optical fiber is continuously coated with one or more polymeric materials that are cured to form a sheath to protect the film from external damage and preserve the strength of the glass optical fiber. The coated fiber is collected on a spool.

The draw furnace is a heated section of a tubular enclosure defining a draw chamber that surrounds at least a portion of the preform, including the neck-down region where the fiber is drawn. This tubular enclosure, generally referred to as a susceptor or muffle is typically cylindrical and typically made of graphite or zirconia. During fiber draws in a graphite muffle, silicon carbide (SiC) particles are continuously produced by reaction of silica ($SiO_2$) with carbon (from the graphite walls of the muffle) at the high temperature (typically about 1900° C. or higher) within the draw furnace to produce silicon carbide and carbon dioxide ($SiO_2+3C \rightarrow SiC+2CO(g)$). Other particles that can be produced in the draw furnace include carbon (C), silica ($SiO_2$), silicon monoxide (SiO) and silicon nitride ($Si_3N_4$). The presence of these particles in the processing environment of the draw furnace, especially SiC, can cause breaks in the glass optical fiber during the drawing process. Such breaks are highly undesirable, resulting in prolonged periods during which production is suspended and substantial amounts of product is scrapped. Particles in the muffle can also become occluded at the surface of the glass optical fiber creating defects (known as "point defects") that cause unacceptable loss of signal and scrapping of product.

It has been determined that production quality glass optical fibers can be maximized by cleaning the interior surface of the muffle on approximately a monthly basis, with longer periods between cleanings resulting in an unacceptably high frequency of breaks during the draw and/or unacceptably high frequency of point defects caused by particulate matter, whereas shorter periods between cleanings generally result in unacceptably long periods of production stoppages as the conventional cleaning process takes about 5 hours. Specifically, the conventional process requires cooling the draw furnace to room temperature to facilitate manual cleaning (about 1.5 hours), about 1 hour to manually clean the furnace, about 1 hour to purge the furnace with an inert gas (typically argon), and about another 1.5 hours to heat the furnace back to the operating temperature. Annual production down time is therefore about 60 hours per draw production line, representing a significant amount of lost production time and use of human resources.

SUMMARY OF THE DISCLOSURE

This disclosure provides an improved process for cleaning particulate matter from interior surfaces of an optical fiber draw furnace by propagating sound waves through the draw furnace. The sound waves can have a frequency from about 75 Hz to about 5000 Hz and an intensity of from about 110 dB to about 160 dB. The sonic cleaning process provides a substantial reduction in the amount of time needed for cleaning the draw furnace, a significant reduction in production interruptions caused by breaks of optical glass fiber induced by particle contamination during draw, and substantial benefits relating to reduced labor and increased production.

In certain aspects, there is provided an arrangement for cleaning particulate matter from interior surfaces of an optical fiber draw furnace, which includes an optical fiber draw furnace and a sonic device that is configured to propagate sound waves through the draw furnace at a frequency of from about 75 Hz to about 5000 Hz and at an intensity of from about 110 dB to about 160 dB.

In certain other aspects, there is provided a sonic device for cleaning an optical fiber draw furnace, which includes a driver for generating sound capable of propagating sound waves through a draw furnace at a frequency at from 75 Hz to 5000 Hz and at an intensity of from 110 dB to 160 dB. The sonic device also includes a horn for directing sound from the driver to an inlet of a draw furnace and an adaptor for sealingly securing an end of the horn to the inlet of the draw furnace.

DETAILED DESCRIPTION

Disclosed is a process for sonically cleaning particles from a glass fiber draw furnace, preferably while the furnace is maintained at or near the normal operating temperature that is used during fiber production. Cleaning as used herein generally refers to removal of particles having a dimension greater than about 1 μm, and preferably removing particles having a dimension greater than 0.5 μm, from interior surface of the muffle, particularly in the heated draw furnace section of the muffle defining a draw chamber. It has been determined that sound propagated through the muffle causes particles on the interior surface of the muffle to vibrate and overcome the Van der Waals or electrostatic forces that bond the particles to graphite surfaces of the muffle interior. An argon (or other inert gas) purge can be maintained throughout the cleaning process to prevent oxidation of the graphite at the normal operating temperature maintained during the cleaning, and to carry the particles dislodged from the graphite surfaces toward and through a muffle or furnace outlet.

Figure 1:
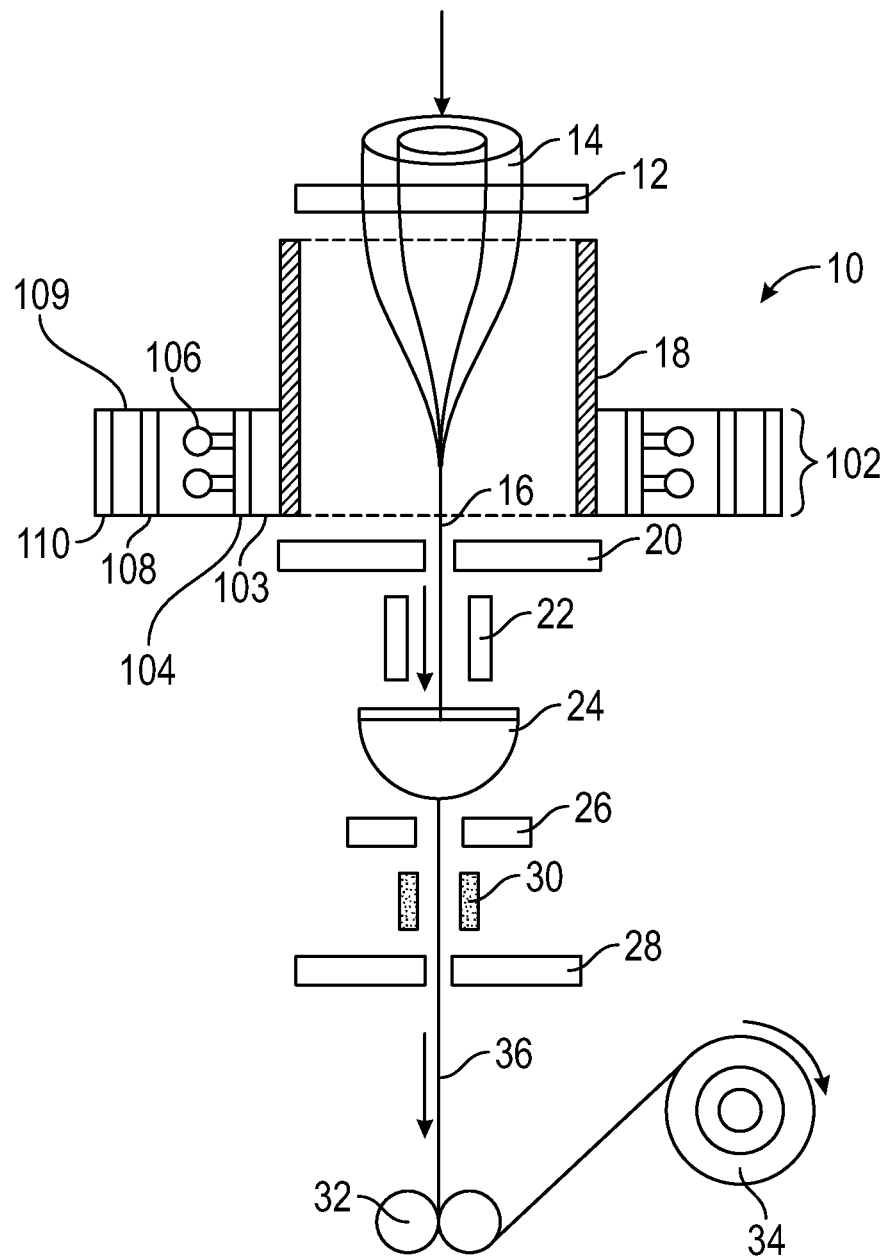
FIG. 1 is a schematic illustration of a generic optical fiber production line.

An optical fiber production line is shown schematically in FIG. 1. The production line 10 includes a feed mechanism 12 for feeding a preform 14 into muffle 18 heated by draw furnace 102. As used herein, "muffle" refers to a tubular (typically cylindrical) structure surrounding at least a portion of the preform, including the neck-down region of the preform where the preform transitions from a large diameter to the very small diameter of an optical fiber. The neck-down region of the muffle is the region of highest temperature during fiber production and can be referenced to as the draw furnace. In as much as the draw furnace is a heated section of the muffle, directing sound waves through the muffle is generally synonymous with directing sound waves through the draw furnace. The muffle typically has smooth surfaces that minimize turbulence and typically acts to absorb heat from an induction heating element and emit the absorbed heat (as infrared radiation) evenly across its interior surface. The draw furnace 102 can include an insulator 103 that surrounds a lower or neck-down region of the muffle 18. Insulator 103 can be disposed between an outer wall of muffle 18 and an inner wall of a quartz containment 104. Induction heating coils 106 are located in an annular space between containment 104 and inner housing wall 108. An annular cooling cavity 109 for circulation of a cooling fluid can be defined between inner housing wall 108 and an outer housing wall 110. The diameter of the glass optical fiber 16 is continuously measured by monitor 20 as the glass optical fiber 16 exits muffle 18. The glass optical fiber 16 is passed through a controlled cooling section 22 and then through one or more coating dies 24, which apply one or more curable coating compositions to glass optical fiber 16. One or more coating concentricity monitors 26 and one or more coating diameter monitors 28 may be employed to ensure that the coating(s) is (are) being applied according to thickness and concentricity specifications. A curing furnace or ultraviolet light source 30 causes the coating(s) to cure to form a solidified coating. The coated optical fiber 36 is then directed by drawing pulleys 32 to take up spool 34 for collection. The schematic of FIG. 1 is illustrative of a typical or generic optical fiber production line, it being understood that multiple coatings may be applied to the drawn fiber if desired or as necessary for a particular application or product. In fact, two coating layers are typically applied, with the first layer being a softer inner coating and the second being a harder outer coating. This combination provides mechanical protection for handling while protecting the surface of the glass fiber from harsh environments.

Each spool of coated optical fiber 36 is wound through a series of capstans and subjected to load testing (screen testing) to ensure that the coated optical fiber 36 meets specified tensile strength requirements. The coated optical fiber 36 is then spooled onto shipping reels and/or cut to specified lengths for shipment to customers.

The coated optical fiber 36 may also be tested for point defects, such as with an optical time domain reflectometer (OTDR), to evaluate anomalies that could adversely affect signal transmission characteristics (e.g., attenuation, bandwidth, numerical aperture, cut-off wavelengths, mode field diameter and chromatic dispersion).

Anomalies that can adversely affect signal transmission characteristics are often caused by SiC or other particles that become attached or occluded to the surface of the glass optical fiber 16 as it is being drawn through the draw furnace 102. The particles are contaminants that form in the draw furnace 102 due to reaction or decomposition of the preform and/or materials of construction of the draw furnace. SiC, for example, forms from a reaction of $SiO_2$ with graphite surfaces (e.g. muffle 18) present in the draw furnace. Other contaminant particles include $SiO_2$, SiO, $Si_3N_4$, and C. The presence of such particles, as well as breaks caused when such particles impinge on the glass optical fiber 16 during draw, can be minimized by periodically cleaning the draw furnace to remove particulate matter, especially larger particles (e.g., those having a dimension greater than 1 μm or 0.5 μm), from the draw furnace. It is believed that about half (50%) of draw breaks are currently caused by contaminant particles in the processing environment of the draw furnace.

Figure 2:
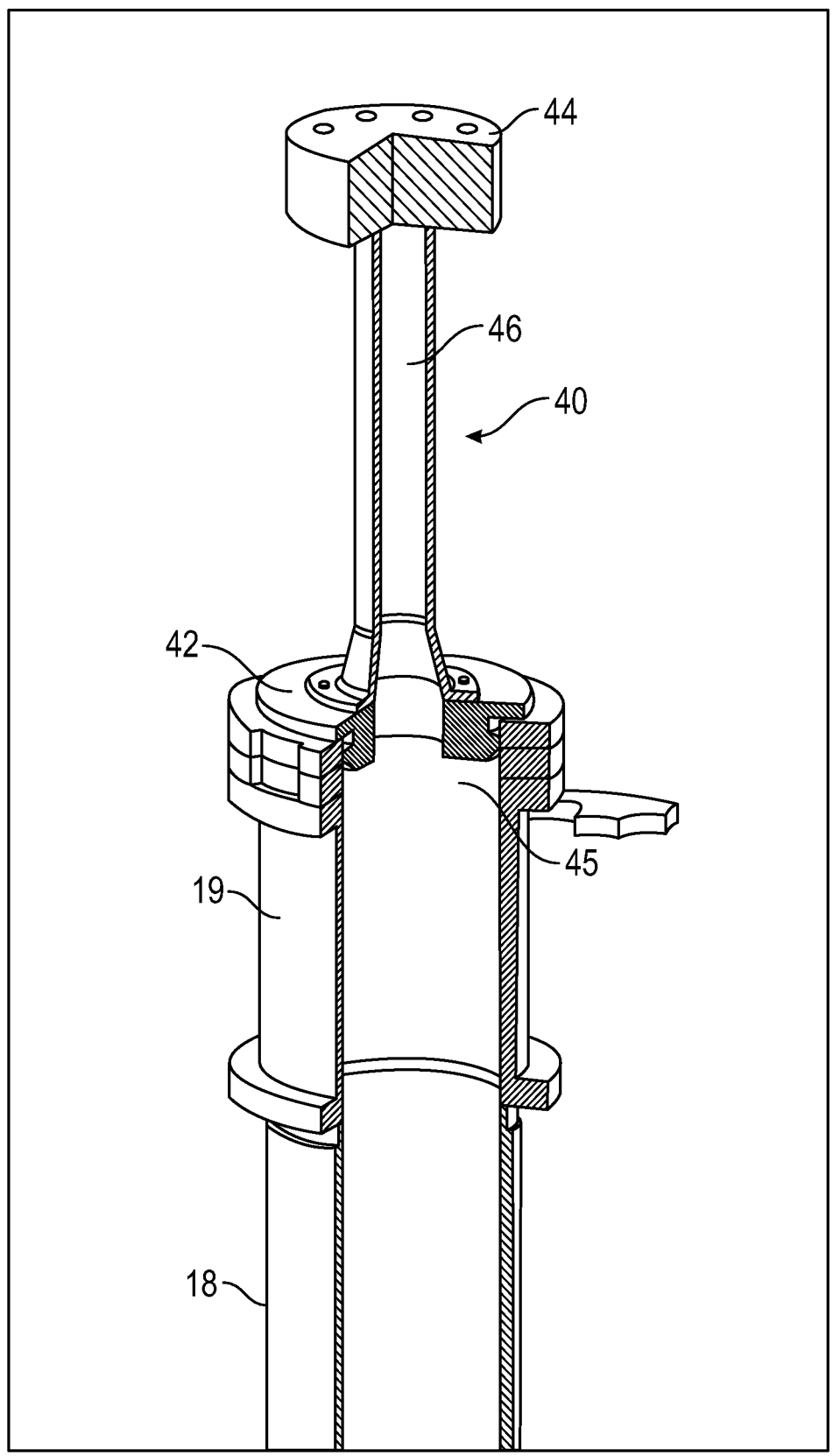
FIG. 2 is a partial perspective of a muffle for an optical fiber draw furnace having a sonic cleaning device mounted at an inlet of the muffle.

FIG. 2 shows a partial perspective of a muffle 18 and muffle extension 19 with a section of the muffle 18 and muffle extension 19 cut-out to show the interior thereof. A sonic device 40 is mounted at a top end of muffle extension 19 using an adaptor 42 that provides a gas-tight seal between the sonic device 40 and muffle extension 19. During cleaning, the muffle does not contain a preform and fiber is not drawn. A typical muffle diameter is about 6.5 inches (16.5 cm). However, smaller diameter and larger diameter (e.g., 23 inches or 58 centimeters) muffles are sometimes used. The total length (height) of the muffle and muffle extensions can be about 3.3 meters (3 meters for muffle and 0.3 meters for the muffle extension). The sonic device 40 includes a transducer or driver 44 and horn or speaker 46 (e.g., a tube having a divergent outlet, such as a bell-shaped, tapered or conical outlet) for generating sound having a frequency of from 75 Hz to 5000 Hz and an intensity of from 110 dB to 160 dB, more preferably from 125 dB to 160 dB. The sonic driver 44 and horn 46 can be adapted to generate a broad range of frequencies or a narrow range of frequencies. A currently preferred or suitable frequency is about 220 Hz. The sonic device directs sound into the top or inlet 45 of muffle 18 at the desired intensity (e.g., 110 dB to 160 dB), which intensity is only slightly attenuated within the muffle. For example, in a conventional cylindrical draw oven muffle having a length of about 3 meters and a diameter of about 15 cm, the sound intensity at the bottom or outlet of muffle 18 will be about 108 dB when the inlet intensity is 130 dB and the frequency is 220 Hz. Lower frequency is preferred because of lower energy attenuation. It is believed that the attenuation will not vary significantly for the variety of muffle geometries and sizes useful in an optical fiber draw furnace, and that the processes and apparatuses described herein can be advantageously employed with any commercially practical optical fiber draw furnace.

In various embodiments, the sound intensity at the top 45 of muffle 18 is greater than 95 dB, or greater than 110 dB, or greater than 125 dB, or greater than 140 dB, or in the range from 95 dB to 160 dB, or in the range from 110 dB to 160 dB, or in the range from 125 dB to 160 dB. The sound intensity at the top or entrance of horn 46 should be at least 150, 160 or 170 dB. The process of cleaning draw furnace using a sonic device has an important advantage of allowing cleaning without cooling the furnace to or near room temperature as is required for standard manual cleaning processes. Using the sonic device 40, muffle 18 can be cleaned at high temperatures, especially and desirably, at or near the normal operating temperature used during fiber production (e.g., from above about 1000° C., or above about 1250° C., or above about 1500° C., or above about 1750° C., or in the range from about 1000° C. to about 2000° C., or in the range from about 1250° C. to about 1950° C., or in the range from about 1500° C. to about 1900° C.). The temperature within the draw chamber is assumed to be equal to the temperature of the muffle, which can be directly measured using an infrared pyrometer.

An inert gas purge is maintained throughout the cleaning process, as graphite is easily oxidized at high operating temperatures in the presence of oxygen. A preferred inert gas for purging the furnace during cleaning is argon. However, other inert gases, such as helium or nitrogen, can be used.

Complete or near complete removal of particles having a size (e.g. diameter or length) greater than 0.5 μm or 1.0 μm from internal surface of muffle 18 can be achieved using sound at a frequency of 75 Hz to 5000 Hz and an intensity of from about 110 dB to 160 dB for a period of time from about 15 seconds to about 2 minutes. As used herein, the size of a particle refers to the equivalent spherical diameter for a non-spherical particle, which is determined by calculating the diameter of a spherical particle whose largest cross-sectional area is equal to the largest cross-sectional area of the non-spherical particle. If the particle is spherical, size refers to the diameter of the particle. If the particle is non-spherical, size refers to the square root of the product of the largest cross-sectional area of the non-spherical particle and $4/\pi$. Desirably, a sound intensity of from about 125-160 dB can be employed over a period of from 15 seconds to 1 minute to remove all or most particles having a size greater than 0.1 μm, which is believed to be the minimum particle size that can cause a draw break (also known as a draw induced point defect or DIPD). It has been determined that the foregoing objective can be achieved in one embodiment when the intensity of the sound from the driver 44 is at least 130 dB at the muffle inlet 45 (i.e., approximately at the adaptor 42). In other embodiments, the sound waves from the sonic device are directed to muffle inlet 45 for a time period of at least 10 sec, or at least 20 sec, or at least 30 sec, or at least 40 sec, or in the range from 10 sec to 10 min, or in the range from 10 sec to 5 min, or in the range from 15 sec to 4 min, or in the range from 20 sec to 3 min.

Figure 3:
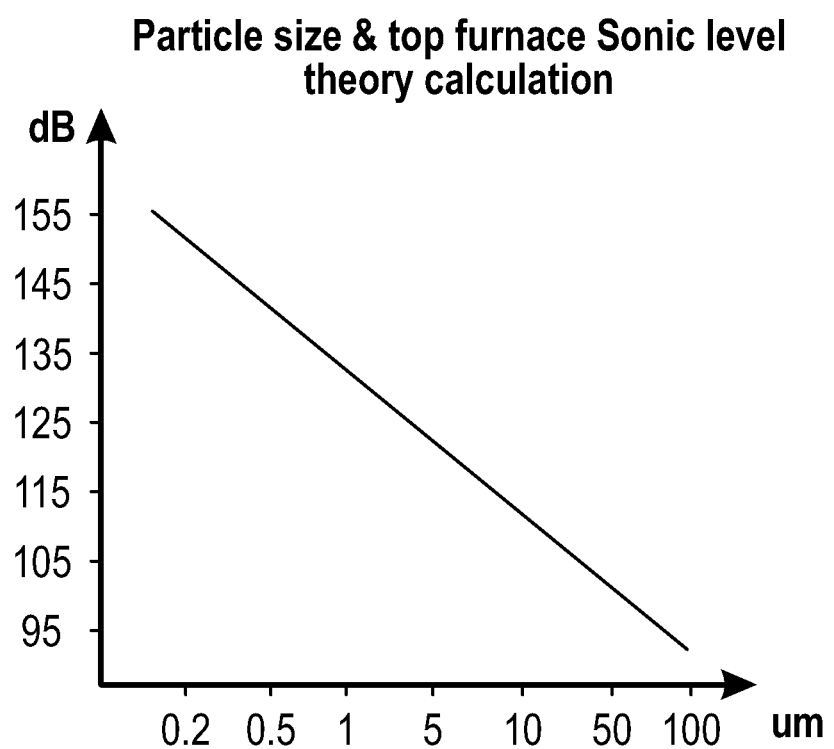
FIG. 3 is a graph showing the theoretically determined sound intensity needed for cleaning particles of a particular size (or larger) from interior surfaces of the furnace.

FIG. 3 is a graph of the minimum sound intensity needed to dislodge particles from a graphite surface as a function of particle diameter based on theoretical calculations. For the theoretical calculations, it was assumed that the particles were spherical and that the Van der Waals Force of Adhesion ($F_{VDW}$) is determined as follows: $F_{VDW}=AR/6D^2$, where A is the Hamaker constant, which was assumed to be $8.86 \times 10^{-20}$ J, R is the particle radius, and D is the distance between the particle and the graphite surface to which the particle is adhered (assumed to be 0.01 μm for purposes of the theoretical calculation). It was assumed that the sonic force ($F_{SONIC}$) is given as follows: $F_{SONIC}=ma=V\rho a=S\lambda\rho a=(\frac{1}{4}\pi d^2)\lambda\rho a=(\frac{1}{4}\pi d^2)\rho(v/f)a=7.09\times10^{-12}$ N, where m is the weight (in units of kg) of the argon within one sonic wavelength, "a" is the amplitude of acceleration (in units of m/s$^2$), V is the volume (in units of m$^3$) of the argon within one sonic wavelength, ρ is the density of argon (1.7837 kg/m$^3$ at 20° C. and normal atmospheric pressure), λ is the sonic wavelength ($\lambda=v/f$), v=the sonic speed in dry gas environment (about 344 m/s), f is the sonic wave frequency (assumed to be 220 Hz), S is the particle cross-sectional area, and "d" is the minimum particle diameter. During experimental trials, it was determined that the argon exiting the high temperature (e.g., >1500° C.) muffle had a temperature of about 60° C. due to the high volumetric flow. It is believed that muffle temperature and pressure during the cleaning process will not have a significant impact on the sound intensity needed to achieve effective removal of particles from the interior surfaces of the muffle.

It was assumed that the amplitude of acceleration is given by $a=P_m\omega/(\rho v)=P_m(2\pi f)/(\rho v)=2.35 P_m$, where d is the minimum particle diameter, λ is the sonic wavelength, f=sonic frequency, ω is the angular velocity, and $P_m$ is the sonic maximum pressure.

Using the foregoing theory and assumptions, FIG. 3 was generated and shows that at a sonic frequency of 220 Hz and a muffle with typical dimensions of 3 meters long by 15 cm diameter, a minimum sound intensity of approximately 95 dB is needed at the muffle inlet to remove particles having a size of about 100 μm or greater, a minimum sound intensity of approximately 130 dB is needed to remove particles having a size of about 1 μm or greater, and a minimum sound intensity of about 160 dB is needed to remove particles having a size of 0.1 μm or greater, with there being approximately a linear relationship between the required sound intensity and the particle size (plotted on a logarithmic scale). It is believed that the required sound intensity does not depend strongly on particle composition and that the minimum required sound intensity needed to remove particles from surfaces of the muffle depends almost exclusively on particle size. However, the use of inert gases other than argon (e.g., helium or nitrogen) could affect the sonic force needed to remove particles, possibly requiring adjustment of the above calculations to account for attributes characteristic of the inert gas.

As a practical matter, there is a great benefit in removing particles having a dimension greater than about 1 μm, a benefit in removing particles having a dimension greater than about 0.5 μm, and a marginal benefit in removing particles having a dimension greater than 0.1 μm. There is very little practical benefit in removing particles smaller than 0.1 μm, as such smaller particles have less of a propensity to cause draw interruptions or point defects. Further, high sound intensities can cause damage to the graphite surfaces of the draw furnace. Accordingly, it is believed that the greatest practical benefits of the disclosed process can be achieved when the sound intensity from driver 44 (or sound intensity entering the draw furnace or sound intensity entering the muffle) is from about 110 dB to 160 dB, although somewhat lower intensity levels can provide some benefit in terms of removing larger particles that can cause a draw induced point defect or anomaly that deleteriously affects signal propagation characteristics. Also, while sound intensity levels somewhat higher than 160 dB can provide some benefit in removing very small particles (<0.1 μm), such benefit is usually marginal and should be weighed against the risk of causing damage to the graphite surfaces of the draw furnace.

Experimental production runs indicate that using the disclosed sonic cleaning process on a weekly basis as compared to using the conventional sponge cleaning technique on a monthly basis reduces draw induced point defects (i.e., draw breaks that disrupt production) significantly. For example, fiber produced on three production lines over a four-month period showed an average reduction in screen breaks of over 15% (as measured by the number of breaks per million meters of fiber) when cleaning was performed on a weekly basis using the sonic process disclosed herein instead of using the conventional sponge cleaning process on a monthly basis.

It was determined that because the draw furnace does not need to be cooled to room temperature or heated back up to operating temperature, and because only about 2 minutes or less of sonic treatment is needed, the total cleaning time (i.e., the time between the end of one production run, before cleaning, and the start of another production run, after cleaning) can be reduced from about 5 hours for sponge cleaning to only about 10 minutes to about 20 minutes for the disclosed sonic cleaning process (i.e., about 17 hours annually for weekly sonic cleanings, as compared with 60 hours annually for conventional sponge cleaning). Cleaning the interior surfaces of the draw furnace and/or surfaces of the muffle at a higher frequency (weekly rather than monthly) with reduced down time is expected to provide a significant increase in maximum length and about $200,000 savings per production line, while enabling higher draw speeds with lower impact to draw performance.

The disclosed sonic cleaning process is expected to remove all particles or substantially all particles (at least 99% or at least 95%) having a dimension equal to or greater than 0.1 μm when the intensity of the sound is at least 160 dB at a sonic frequency of 220 Hz at the top or muffle inlet 45 of muffle 18 having typical dimensions (e.g., about 3 meters long by 15 cm diameter). The process is expected to remove all particles or substantially all particles (at least 99% or at least 95%) having a dimension equal to or greater than 1.0 μm when the intensity is at least 130 dB at a sonic frequency of 220 Hz at the top or muffle inlet 45 of muffle 18 having typical dimensions (e.g., about 3 meters long by 15 cm diameter.

Particles that are dislodged from the graphite surfaces of the muffle of a draw furnace fall or are carried by the purge gas to the bottom of the draw furnace and exhausted through an outlet of the draw furnace. During the sonic cleaning process, it is recommended that the outlet from the draw furnace be outfitted with a filter to collect particles and a silencer to reduce noise and minimize health risks to workers in the area of the draw furnace. The outlet can also be outfitted with a filter to collect particles (e.g., to collect most of the dislodged particles).

As a practical matter, cleanliness or effectiveness of the cleaning process can be evaluated by monitoring performance (e.g., the frequency at which draw interrupting breaks occur). It is also possible to sample the purge gas exiting the furnace to determine particle count and particle sizes using a laser and dynamic light scattering techniques.

Aspect 1 of the description is:
A process for cleaning an optical fiber draw furnace comprising:

directing sound waves into the interior of a muffle of the optical fiber draw furnace, the muffle having particles adhered to a surface thereof, the sound waves having a sonic force sufficient to dislodge the particles from the surface of the muffle.

Aspect 2 of the description is:
The process of Aspect 1, wherein the sound waves have a frequency in the range from 75 Hz to 5000 Hz.

Aspect 3 of the description is:
The process of Aspect 1 or 2, wherein the sound waves have an intensity greater than 95 dB at the interior surface of the muffle.

Aspect 4 of the description is:
The process of Aspect 1 or 2, wherein the sound waves have an intensity greater than 110 dB at the interior surface of the muffle.

Aspect 5 of the description is:
The process of Aspect 1 or 2, wherein the sound waves have an intensity in the range from 110 dB to 160 dB at the interior surface of the muffle.

Aspect 6 of the description is:
The process of any of Aspects 1-5, wherein the sound waves are directed into the interior of the muffle for a time period of at least 10 sec.

Aspect 7 of the description is:
The process of any of Aspects 1-5, wherein the sound waves are directed into the interior of the muffle for a time period in the range from 10 sec to 10 min.

Aspect 8 of the description is:
The process of any of Aspects 1-7, wherein the muffle comprises graphite.

Aspect 9 of the description is:
The process of any of Aspects 1-8, wherein a temperature in the muffle is greater than about 1000° C.

Aspect 10 of the description is:
The process of any of Aspects 1-8, wherein a temperature in the muffle is greater than about 1500° C.

Aspect 11 of the description is:
The process of any of Aspects 1-8, wherein a temperature in the muffle is in the range from about 1500° C. to about 1900° C.

Aspect 12 of the description is:
The process of any of Aspects 1-11, wherein the particles comprise silicon.

Aspect 13 of the description is:
The process of Aspect 12, wherein the particles comprise silicon carbide.

Aspect 14 of the description is:
The process of any of Aspects 1-13, wherein the particles have a size greater than 0.5 μm.

Aspect 15 of the description is:
An apparatus for cleaning a draw furnace for optical fiber production, comprising:

a draw furnace, the draw furnace having a muffle; and
a sonic device operably coupled to the muffle, the sonic device configured to direct sound waves into the interior of the muffle.

Aspect 16 of the description is:
The apparatus of Aspect 15, wherein the muffle comprises graphite.

Aspect 17 of the description is:
The apparatus of Aspect 15 or 16, wherein the sonic device is operably coupled to an inlet of the muffle with an adaptor, the adaptor configured to form a seal between the sonic device and the inlet.

The described embodiments are preferred and/or illustrated, but are not limiting. Various modifications are considered within the purview and scope of the appended claims.

What is claimed is:

1. A process for cleaning an optical fiber draw furnace comprising:
    directing sound waves into an interior of a muffle of the optical fiber draw furnace, the muffle having particles adhered to a surface thereof, the sound waves having a sonic force sufficient to dislodge the particles from the surface of the muffle; and
    maintaining an inert gas purge in the optical fiber draw furnace throughout the cleaning process to prevent oxidation of the muffle.

2. The process of claim 1, wherein the sound waves have a frequency in the range from 75 Hz to 5000 Hz.

3. The process of claim 1, wherein the sound waves have an intensity greater than 95 dB at the interior surface of the muffle.

4. The process of claim 1, wherein the sound waves have an intensity greater than 110 dB at the interior surface of the muffle.

5. The process of claim 1, wherein the sound waves have an intensity in the range from 110 dB to 160 dB at the interior surface of the muffle.

6. The process of claim 1, wherein the sound waves are directed into the interior of the muffle for a time period of at least 10 sec.

7. The process of claim 1, wherein the sound waves are directed into the interior of the muffle for a time period in the range from 10 sec to 10 min.

8. The process of claim 1, wherein the muffle comprises graphite.

9. The process of claim 1, wherein a temperature in the muffle is greater than about 1000° C.

10. The process of claim 1, wherein a temperature in the muffle is greater than about 1500° C.

11. The process of claim 1, wherein a temperature in the muffle is in the range from about 1500° C. to about 1900° C.

12. The process of claim 1, wherein the particles comprise silicon.

13. The process of claim 12, wherein the particles comprise silicon carbide.

14. The process of claim 1, wherein the particles have a size greater than 0.5 µm.

* * * * *

UNITED STATES PATENT AND TRADEMARK OFFICE
CERTIFICATE OF CORRECTION

| | | |
|---|---|---|
| PATENT NO. | : 11,407,012 B2 | Page 1 of 1 |
| APPLICATION NO. | : 16/937052 | |
| DATED | : August 9, 2022 | |
| INVENTOR(S) | : Xiaoming Chen et al. | |

It is certified that error appears in the above-identified patent and that said Letters Patent is hereby corrected as shown below:

On the Title Page

In Item (56), in Column 2, under "Other Publications", Lines 6-7, delete "Administration, list of references, otherwise blank." and insert -- Administration. --.

Signed and Sealed this
Twenty-ninth Day of November, 2022

Katherine Kelly Vidal
*Director of the United States Patent and Trademark Office*